July 28, 1931.  H. A. TUTTLE  1,816,029
SHOCK ABSORBER
Filed Oct. 5, 1928
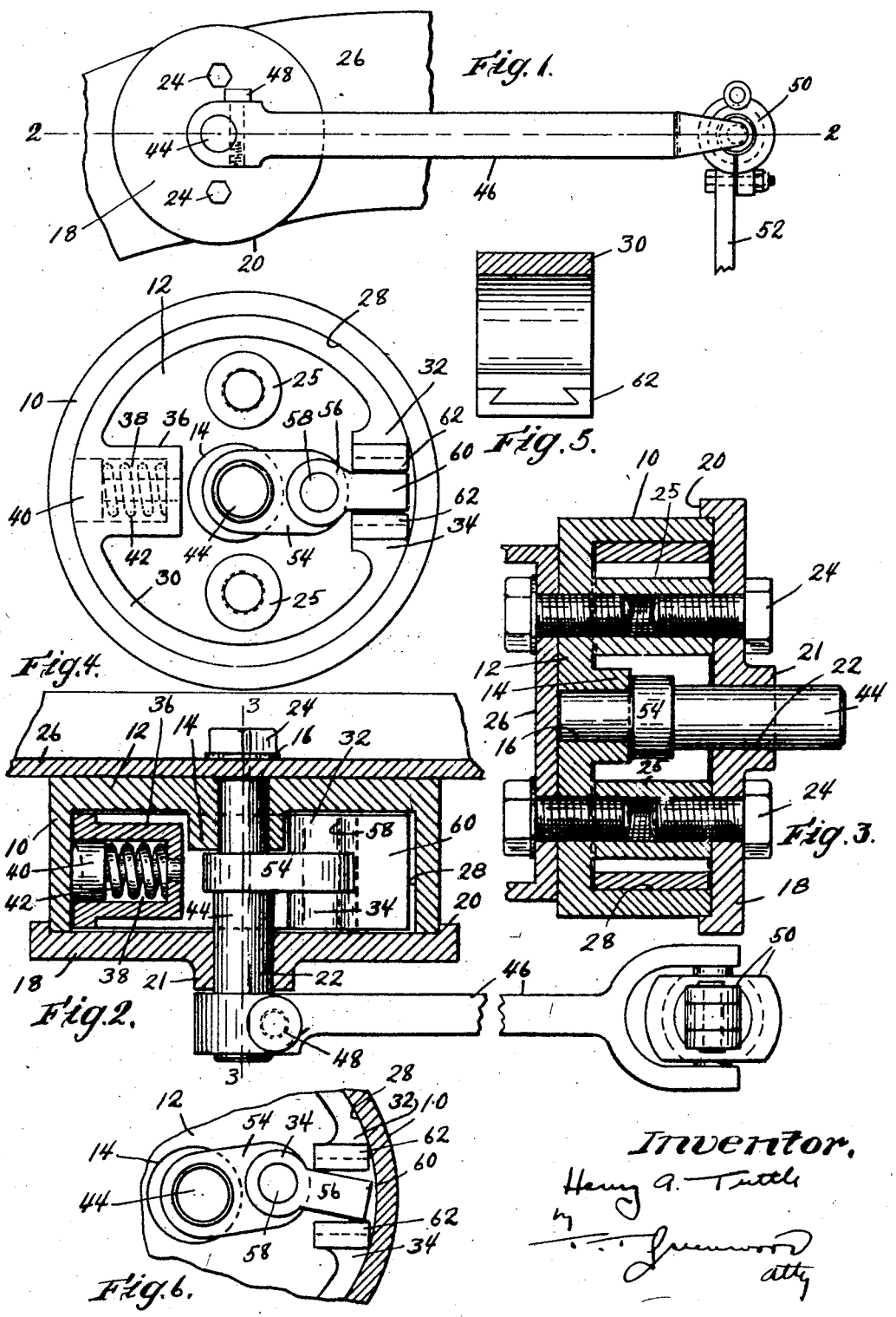

Patented July 28, 1931

1,816,029

UNITED STATES PATENT OFFICE

HENRY A. TUTTLE, OF UPTON, MASSACHUSETTS; JENNIE L. TUTTLE EXECUTRIX OF SAID HENRY A. TUTTLE, DECEASED

SHOCK ABSORBER

Application filed October 5, 1928. Serial No. 310,611.

This invention relates to shock absorbers especially adapted to control the action of the springs on automobiles.

One of the objects of the present invention is the provision of a shock absorber which has a brake shoe that is adapted to be expanded into engagement with a stationarily supported brake drum upon movements of a spring supported member, whereby to control the movements of such member.

Another object of the invention is the provision of a shock absorber of the above type so arranged that movements of the spring in opposite directions are controlled.

A further object of the invention is the provision of a shock absorber of the above type wherein the braking effect is increased upon excessive and also upon sudden deflections of the spring or movable member.

A yet further object of the invention is a shock absorber which is cheap and simple in construction and has a long effective life and is adapted to operate in an oil bath.

A further object of the invention is generally to improve the construction of shock absorbers.

Fig. 1 is a side elevation of a shock absorber embodying the invention attached to the frame of an automobile.

Fig. 2 is a plan view taken along line 2—2 of Fig. 1.

Fig. 3 is a sectional elevation taken along line 3—3 of Fig. 2.

Fig. 4 is a front elevation of the shock absorber with the cover plate and operating lever removed.

Fig. 5 is a detailed end view of one of the ends of the brake shoe and illustrating the construction of the wear-plate thereof.

Fig. 6 is a detail similar to Fig. 4 illustrating the relation between the ends of the expanded brake shoe and the cam finger.

The shock absorber herein illustrated as embodying this invention comprises a stationary cylindrical drum 10 preferably formed of cast iron for its wearing and frictional qualities. Said drum is open at the front and is closed at the rear by a radial wall 12 which is provided internally of the drum with a centrally located boss 14 having an axial passage 16 therein for an operating shaft. The drum is closed in an oil tight manner by a removable cover plate 18 which is provided with an axially extended peripheral flange 20 which overlies and snugly engages the outer periphery of the drum 10. Said cover plate is provided with an outstanding hub 21 having an aperture 22 therein aligned with the aperture 16 which is adapted to receive the operating shaft. The cover is secured detachably to the drum or casing by bolts 24 which are passed through the cover and are threaded in through-holes in bosses 25 that are located within the drum and are integral with the rear wall 12 thereof. Other bolts are threaded into said holes and are adapted to be passed through a frame member 26 or other suitable part of the automobile whereby to secure the shock absorber casing rigidly thereto. Preferably the boss 21 of the cover plate is higher than the heads of the bolts so that the drum can be located on the frame of the automobile in any suitable angular position thereon without interfering with the free operation of the shock absorber as will presently appear. The drum 10 is provided with an internal cylindrical inner brake face 28 which is coaxial with the passages 16 and 22.

A rotatable circular brake shoe 30 in the general form of a ring is received within the drum 10 and is provided with confronting and closely spaced free ends 32 and 34 which are adapted to be spread apart to force the brake shoe into frictional engagement with the drum. The brake shoe opposite the confronting ends is provided with an inwardly directed boss 36 which has a recess 38 therein in which a plunger 40 is located. Said plunger has an outer arcuate face which is conformed with the braking face 28 of the drum; and a spring 42 is located under said plunger 40 and bears thereagainst and against the lug 36 at the bottom of the recess whereby to press said brake shoe constantly against the brake drum, thereby to maintain the brake shoe at all times in substantial frictional engagement with the drum.

The movements of the spring of the automobile, through suitable operating mechanism, are adapted to spread the free ends of the brake shoe apart and thus force the shoe into increased frictional engagement with the brake drum and also to rotate the brake shoe in its frictional engagement with the drum. To this end, an operating shaft 44 is rotatably received in the apertures 22 and 16 respectively of the cover plate 18 and rear wall 12 of the drum. An operating lever 46 is fixed to the outer end of said shaft by any suitable means as the bolt 48 which passes through said lever and a slot in the periphery of said shaft and outstands beyond the heads of the supporting bolts 24 so that it is free to oscillate in whatever angular position it may be located with respect to the brake drum. The outer end of said lever is connected by a universal joint 50 of any suitable construction to one end of a link 52 and the other end of the link is suitably connected to a spring, or other part, not shown, the movements of which are to be controlled by the shock absorber.

The shaft 44 preferably is integral with a radially extended arm 54 which is located within the drum 10 and also within the brake shoe 30 and is constrained to reciprocate with said shaft. A cam finger 56 overlies the opposite faces of said arm 54 and is pivoted thereto by a pin 58 that passes through said finger and also through said arm. The outer end 60 of said cam finger is located between the confronting ends 32 and 34 of the brake shoe and has flat parallel opposed faces which closely overlie the similar faces of the ends of the brake shoe. The cam finger preferably is made of hardened steel and the ends of the brake shoe are provided with removable hardened steel wear-plates 62 which are adapted to be engaged by said cam finger. Said wear-plates have removable dove-tailed connections 63 with the ends of the brake shoe as illustrated in Fig. 5.

When the brake shoe is in a normal position corresponding with the normal position of the automobile spring, the confronting ends of the wear-plates are adapted to be close to or in engagement with the opposite faces of the cam finger and the cam finger is adapted to be radially disposed as illustrated in Fig. 4.

When the shaft 44 is rotated in either direction due to the action of the spring with which it is connected, the inner or pivoted end of the cam finger is moved out of its radial position into some inclined position with respect to the free ends of the brake shoes as illustrated in Fig. 6. In this position, one face of the cam finger presses against an inner portion of the face of one end of the brake shoe and against an outer portion of the face of the other end of the brake shoe thereby forcing the ends of the shoe apart and consequently forcing the brake shoe into increased frictional engagement with the stationary drum. At the same time, the rotation of the shaft causes the brake shoe to be rotated within the drum. Consequently, the brake shoe opposes the rotation of the shaft and thus the action of the spring.

When the spring moves in the opposite direction, as on the rebound, the shaft 44 moves in the opposite direction and thus restores the cam finger momentarily to its radial position, thus permitting the spring a certain amount of free movement at the start of its movement in such direction. Upon further movement, however, the cam finger is tilted in the opposite direction from that shown in Fig. 6 and so exerts a braking effect on the spring to retard its free movement in this direction. Consequently undue movement of the spring in both directions is restricted while permitting a certain and desirable amount of free movement of the spring. The braking effect is also increased for sudden spring movements since the more suddenly the arm 46 is rotated, the greater is the tilting movement of the cam finger and thus the greater is the pressure of the brake shoe on the brake drum. This is highly desirable since it permits slow deflections of the automobile spring without undue restriction and yet controls and checks sudden displacements of the spring.

The brake shoe is made preferably of bronze as the combination of bronze and cast iron friction faces has been found to be particularly effective and wear-resistant.

The casing is adapted to be filled with oil to lubricate the brake faces and other parts of the mechanism that need lubrication.

I claim:

1. A shock absorber having a stationary brake drum, an internally-expanding brake shoe having confronting ends and located internally of and cooperating with said drum, and a reciprocable operating member, the movements of which are to be controlled, having an operative connection with said shoe between said confronting ends and which is arranged by its movement to expand said shoe into frictional engagement with said drum and also to rotate said shoe.

2. A shock absorber having a stationary brake drum, a rotatable internally-expanding brake shoe cooperating with said drum and having confronting ends, and an actuating member having a connection with said brake shoe between said ends by which movements of said member are retarded, said connection also constituting means operated by its rotation to expand said brake shoe into engagement with said drum and to rotate the expanded shoe.

3. A shock absorber having a stationary brake drum, an internally-expanding rotatable brake shoe cooperating with said drum and having confronting ends, and a reciprocable actuating member having means disposed at least in parts between said confronting ends to reciprocate said brake shoe and also to expand it into frictional engagement with said drum due to the reciprocatory movements of said actuating member.

4. A shock absorber having a stationary brake drum, an internally-expanding rotatable brake shoe located within said drum and having confronting free ends, and an actuating member having a connection with said brake shoe by which to rotate it, said connection also constituting means operated by its brake-actuating movements to force the confronting ends of said brake shoe apart and the shoe into frictional engagement with said brake drum, said confronting means being disposed at least in part between said confronting ends.

5. A shock absorber having a stationary brake drum, a rotatable brake shoe located within said brake drum in frictional engagement therewith and having confronting ends, and a reciprocable actuating member having means located between said confronting ends of said brake shoe and operated by reciprocatory movements thereof to force said ends apart and the brake shoe into increased frictional engagement with said drum, said means also constituting means to rotate said brake shoe.

6. A shock absorber having a stationary brake drum, a rotatable brake shoe disposed internally of said drum in frictional engagement therewith and having confronting free ends, a shoe operating member located between said confronting ends of said shoe and arranged to be tilted to spread said ends apart and the shoe into increased frictional engagement with said drum, and an actuating shaft having a pivotal connection with said tilting member arranged to rotate and tilt said member and also to rotate said brake shoe.

7. A shock absorber having a stationary brake drum, a brake shoe located within said brake drum in frictional engagement therewith and having confronting free ends, a cam member disposed between said free ends and adapted to bear upon both of said ends and to tilt and force them apart, and an actuating shaft having a connection with said cam member for tilting it and also for rotating said brake shoe.

8. A shock absorber having a stationary brake drum, a brake shoe located internally of said drum in frictional engagement therewith and having confronting free ends, an actuating shaft located co-axially with said brake drum and shoe, a cam finger disposed between the confronting free ends of said brake shoe and arranged to fulcrum about both confronting ends and to force said ends apart and the brake shoe into increased frictional engagement with said brake drum and also to rotate said shoe, and an arm rotatable with said shaft having a pivotal connection with said cam finger.

9. A shock absorber having a stationary brake drum, a rotatable brake shoe located within said drum, and having confronting free ends, means carried by said brake shoe urging it into frictional engagement with said drum, a cam member located between said confronting free ends arranged to rock upon both of said ends and force said ends apart and the brake shoe into increased frictional engagement with said brake drum, and an actuating shaft having a connection with said cam member arranged to rock it and also to rotate said brake shoe.

10. A shock absorber having a brake drum, a brake shoe located within said drum having confronting free ends, said brake shoe having a recessed inwardly-directed boss opposite said confronting free ends, a plunger located within the recess and bearing against said brake drum, a spring bearing upon said brake shoe and also upon said plunger whereby to force said brake shoe into frictional engagement with said drum, a cam member located between said confronting free ends of said brake shoe arranged to rock upon both of said ends and force said ends apart and the brake shoe into increased frictional engagement with said brake drum, and an actuating shaft having a connection with said cam member arranged to rock it and also to rotate said brake shoe.

11. A shock absorber having the combination of an enclosing casing having a cylindrical wall constituting a brake drum and an end wall which forms a closure for one end of said casing, said casing being open at the other end, a cover plate forming a closure for the open end of said casing, a rotatable internally-expanding brake shoe having confronting ends and located within said casing in frictional engagement with said brake drum, and a shaft located partly within said casing having a connection with said brake shoe by which to rotate it and also by which to expand it into frictional engagement with said brake drum, said connection comprising a tiltable cam member engaged by said confronting brake ends and having an eccentric pivotal connection with said shaft.

12. A shock absorber having the combination of a casing having a cylindrical wall constituting a brake drum and an end wall constituting a closure for one end of the casing, a removable cover plate providing a closure for the open end of said casing, a rotatable brake shoe located within said brake drum having confronting free ends, a tilting cam finger located between said confronting free ends of said brake shoe arranged to tilt upon both of said free ends and force them apart and the brake shoe into frictional engagement with said brake drum, an operating shaft journalled in said cover plate and end wall co-axially with said brake drum and brake shoe, and an arm rotatable with said shaft having a pivotal connection with said cam member arranged to tilt it and also to rotate said brake shoe.

In testimony whereof, I have signed my name to this specification.

HENRY A. TUTTLE.